(12) United States Patent
Wang (10) Patent No.: US 7,142,408 B2
(45) Date of Patent: Nov. 28, 2006

(54) TANTALUM POWDERS AND METHODS OF PRODUCING SAME

(75) Inventor: Duan-Fan Wang, Hillsborough, NJ (US)

(73) Assignee: Cabot Corporation, Boston, MA (US)

( * ) Notice: Subject to any disclaimer, the term of this patent is extended or adjusted under 35 U.S.C. 154(b) by 0 days.

(21) Appl. No.: 10/864,253

(22) Filed: Jun. 9, 2004

(65) Prior Publication Data

US 2004/0252445 A1 Dec. 16, 2004

Related U.S. Application Data (60) Provisional application No. 60/477,418, filed on Jun. 10, 2003.

(51) Int. Cl.
*H01G 9/00* (2006.01)

(52) U.S. Cl. ............... 361/523; 361/512; 361/508; 361/525; 361/528; 361/529; 75/245; 75/343

(58) Field of Classification Search ........ 361/523–525, 361/528–534, 508–509, 512–516, 502–504; 75/245, 343
See application file for complete search history.

(56) References Cited

U.S. PATENT DOCUMENTS

| | | | | |
|---|---|---|---|---|
| 5,217,526 | A | * 6/1993 | Fife | ............................ 75/229 |
| 5,328,501 | A | 7/1994 | McCormick et al. | ......... 75/352 |
| 5,448,447 | A | 9/1995 | Chang | ........................ 361/529 |
| 5,580,367 | A | 12/1996 | Fife | |
| 5,951,739 | A | 9/1999 | Klapdor et al. | ............... 75/371 |
| 5,954,856 | A | 9/1999 | Pathare et al. | ................ 75/255 |
| 6,136,062 | A | 10/2000 | Loffelholz et al. | ............ 75/369 |
| 6,193,779 | B1 | 2/2001 | Reichert et al. | .............. 75/343 |
| 6,238,456 | B1 | 5/2001 | Wolf et al. | ................... 75/245 |
| 6,375,704 | B1 | 4/2002 | Habecker et al. | ............. 75/229 |
| 6,402,066 | B1 | 6/2002 | Habecker et al. | ............. 241/21 |
| 6,689,187 | B1 | 2/2004 | Oda | ............................ 75/255 |
| 6,706,240 | B1 | 3/2004 | Habecker et al. | ............. 419/33 |
| 6,740,288 | B1 | 5/2004 | Ma et al. | ...................... 419/32 |
| 6,896,782 | B1 * | 5/2005 | Melody et al. | ............... 205/50 |
| 2002/0050185 | A1 | 5/2002 | Oda | |
| 2002/0064476 | A1 | 5/2002 | Omori et al. | |
| 2002/0124687 | A1 | 9/2002 | Habecker et al. | ............. 75/230 |

FOREIGN PATENT DOCUMENTS

WO WO 00/67936 A1 11/2000

OTHER PUBLICATIONS

Retsch Brochure (1996).
CCE Technologies, Inc. "Opposed Jet Fluid Energy Mill," www.ccetechnologies.com/opjetmil.html (2002).
Caër et al., "Mechanical alloying and high-energy ball-milling: technical simplicity and physical complexity for the synthesis of new materials," Matériaux, pp. 1-5 (2002).
Zoz, et al., "Processing of Ceramic Powder Using High Energy Milling," Zoz GmbH, Maltoz—Strasse, D-57482 Weden, Germany, pp. 1-12.
International Preliminary Report on Patentability for International Application No. PCT/US2004/018288 dated Dec. 29, 2005.

* cited by examiner

Primary Examiner—Nguyen T. Ha (57) ABSTRACT

Methods of forming tantalum powders and other valve metal powders are described. The method involves high impact milling a starting powder in a fluid medium and optionally a milling media using a high energy mill. The methods of the present invention have the ability to reduce DC leakage and/or increase capacitance capabilities of valve metal powders when formed into capacitor anodes. The methods of present invention further reduce the milling time necessary to form high surface area valve metal powders and leads to reducing contaminant levels in the valve metal powders. The process is particularly well-suited for forming metal flakes, such as tantalum or niobium flakes, of high purity.

22 Claims, 13 Drawing Sheets

TANTALUM POWDERS AND METHODS OF PRODUCING SAME

This application claims priority under 35 U.S.C. §119(e) of prior U.S. Provisional patent application No. 60/477,418 filed Jun. 10, 2003, which is incorporated in its entirety by reference herein.

BACKGROUND OF THE INVENTION

The present invention relates to valve metal powders and electrolytic capacitors using the valve metal powders as well as methods of making the powders and the capacitors. More particularly, the present invention relates to high surface area valve metal powders and capacitors having high capacitance.

Tantalum capacitors, made from tantalum powder, have been a major contributor to the miniaturization of electronic circuits and have made possible the application of such circuits in extreme environments. Tantalum capacitors typically are manufactured by compressing tantalum powder to form a pellet, sintering the pellet in a furnace to form a porous tantalum body (electrode), and then subjecting the porous body to anodization in a suitable electrolyte to form a continuous dielectric oxide film on the sintered body.

Development of powders suitable for making tantalum capacitors has resulted from efforts by both capacitor producers and tantalum processors to delineate the characteristics required for tantalum powder for it to best serve in the production of quality capacitors. Such characteristics include specific surface area, purity, shrinkage, pressability, and the like.

First, the powder should provide an adequate electrode surface area when formed into a porous body and sintered. The μFV/g of tantalum capacitors can be related to the specific surface area of the sintered porous body produced by sintering a tantalum powder pellet. The specific surface area of tantalum powder can be related to the maximum μFV/g attainable in the sintered porous body.

Purity of the powder can also be an important consideration. Metallic and non-metallic contamination tends to degrade the dielectric oxide film in tantalum capacitors. While high sintering temperatures serve to remove some volatile contaminants, high temperatures also tend to shrink the porous body reducing its net specific surface area and thus the capacitance of the resulting capacitor. Minimizing the loss of specific surface area under sintering conditions, i.e., shrinkage, is necessary in order to produce high μFV/g tantalum capacitors.

As discussed above, the μFV/g of a tantalum pellet can be a function of the specific surface area of the sintered powder. Greater net surface area can be achieved, of course, by increasing the quantity (grams) of powder per pellet; but, cost and size considerations have dictated that development be focused on means to increase the specific surface area of tantalum powder.

One proposed method for increasing the specific surface area of tantalum powder is flattening the powder particles into a flake shape. However, efforts to increase specific surface area by making thinner tantalum flakes have been hindered by concomitant loss of processing characteristics, for example, very thin tantalum flake would be expected to have poor pressability and low forming voltages, for example. Also, in processes to making high surface area powders, the milling can take many hours which can be time consuming, expensive, and the long milling times typically result in reaching a point where the powder fractures. Thus, there has been somewhat of a threshold which has prevented high capacitance powders until the present invention.

SUMMARY OF THE PRESENT INVENTION

It is therefore a feature of the present invention to provide wet-milled tantalum powders having flaked, nodular, and/or angular shapes.

Another feature of the present invention is to provide tantalum powders and other valve metals, preferably having high surface areas as well as other physical characteristics which permit the tantalum powders to be formed into capacitors having relatively high capacitance.

A further feature of the present invention is to provide tantalum powders and other valve metals which, when formed into capacitors, have a relatively low DC leakage.

Additional features and advantages of the present invention will be set forth in part in the description that follows, and in part will be apparent from the description, or may be learned by practice of the present invention. The objectives and other advantages of the present invention will be realized and attained by means of the elements and combinations particularly pointed out in the description and appended claims.

To achieve these and other advantages, and in accordance with the purposes of the present invention, as embodied and broadly described herein, the present invention relates to a tantalum powder having a BET surface area of at least 1.5 m$^2$/g, which, when formed into an electrolytic capacitor anode, the anode preferably has a capacitance of at least about 190,000 CV/g, when formed at a $V_f$ of 20 V, and sintered at a temperature of 1400° C. for 10 minutes.

The present invention also relates to a method of making a tantalum powder having a BET surface area of at least about 1.5 m$^2$/g, that includes milling a starting powder in a fluid and optionally a milling media using a high energy mill. The method preferably further includes removing the fluid from the tantalum powder produced.

It is to be understood that both the foregoing general description and the following detailed description are exemplary and explanatory only and are intended to provide a further explanation of the present invention, as claimed.

The accompanying drawings, which are incorporated in and constitute a part of this application, illustrate some of the embodiments of the present invention and together with the description, serve to explain the principles of the present invention.

DETAILED DESCRIPTION OF THE PRESENT INVENTION

The present invention, in part, relates to methods to prepare tantalum powder and other valve metals, preferably having high capacitance and/or low DC leakage capabilities.

For purposes of the present invention, valve metals generally include tantalum, niobium, and alloys thereof, and also may include metals of Groups IVB, VB, and VIB, and aluminum and copper, and alloys thereof. Valve metals are described, for example, by Diggle, in "Oxides and Oxide Films," Vol. 1, pp. 94–95, 1972, Marcel Dekker, Inc., New York, incorporated in its entirety by reference herein. Valve metals are generally extracted from their ores and formed into powders by processes that include chemical reduction, as described for example, in U.S. Pat. No. 6,348,113, by a primary metal processor. Further metal refining techniques typically performed by a primary metal processor include thermally agglomerating the metal powder, deoxidizing the agglomerated metal powder in the presence of a getter material, and then leaching the deoxidized metal powder in an acid leached solution, as disclosed, for example, in U.S. Pat. No. 6,312,642.

Examples of tantalum powders, including flakes, are described in U.S. Pat. Nos. 6,348,113 B1; 5,580,367; 5,580,516; 5,448,447; 5,261,942; 5,242,481; 5,211,741; 4,940,490; and 4,441,927, which are incorporated herein in their entireties by reference. Examples of niobium powders are described in U.S. Pat. Nos. 6,420,043 B1; 6,402,066 B1; 6,375,704 B1; and 6,165,623, which are incorporated herein in their entireties by reference. Other metal flakes, methods for making metal flakes, and uses for metal flakes are set forth in the following U.S. patents, each of which is incorporated herein in its entirety by reference: U.S. Pat. Nos. 4,684,399; 5,261,942; 5,211,741; 4,940,490; 5,448,447; 5,580,516; 5,580,367; 3,779,717; 4,441,927; 4,555,268; 5,217,526; 5,306,462; 5,242,481; and 5,245,514.

The tantalum powder preferably has a BET surface area of at least 1.5 $m^2/g$, or preferably at least 1.7 $m^2/g$, and more preferably, at least about 5 $m^2/g$, and even more preferably from about 5 to about 8 $m^2/g$, and most preferably at least 7.5 $m^2/g$. The BET ranges are preferably based on pre-agglomerated tantalum powder. The tantalum powder can be hydrided or non-hydrided. Also, the tantalum powder can be agglomerated or non-agglomerated.

The present invention, in part, also relates to valve metal flakes and wet-milling or wet-grinding processes for making valve metal flakes. More particularly, the present invention relates to tantalum flakes and niobium flakes. The present invention is useful in wet-milling to make flakes of valve metal, for example, tantalum flakes. Also, the flaked tantalum powder can have an aspect ratio (ratio of diameter to thickness) of from about 1 to about 50. The flaked tantalum powder permits enhanced surface area due to its morphology.

In general, the tantalum powder can be prepared by high impact milling a starting powder dispersed in a fluid medium and optionally milling media using a high energy mill. After milling, the fluid medium can be separated from the tantalum powder. The starting powder can be, for instance, ingot-derived and/or sodium-reduced powder, as described for example, in U.S. Pat. No. 6,348,113 B1. The fluid medium can be a gas and/or liquid. The fluid medium (aqueous or non-aqueous) can be a surfactant, for example, and the fluid can include a lubricating agent such as stearic acid or the like. The milling media can be stainless steel balls, for example. The high energy mill can be, for example, a planetary ball mill. Separating the fluid medium from the tantalum powder can be by evaporation, for example.

In more detail, the various BET surface areas can be achieved by high energy milling or high impact milling the starting powder. The starting valve metal powder can be, for instance, ingot-derived and/or chemically-reduced powder, and is preferably a flaked, angular, or nodular tantalum powder, or combinations thereof. The starting powder can be dispersed in a fluid medium, preferably methanol, to form a slurry. The fluid medium can be a surfactant or surface-active organic agent, for example, and the fluid can include a lubricating agent such as stearic acid or the like. The slurry and grinding media, preferably, balls formed of metal, are combined. The metal balls can contain a coating. The metal balls can be made of the same metal as the powder being milled. The metal balls can be coated or plated with the same metal. Preferably, the grinding media are 3/16" 440C stainless steel balls, but other ball sizes can be used such as 3/8", as well as other materials such as tungsten carbide. Any number of balls can be used and depends on the size of the mill. For example, from about 100 to about 2000. Preferably, at least about 600 or more balls are used. The slurry and optional grinding media can be combined in the grinding chamber of a high-energy mill, for example, a planetary ball mill, a spinning air flow jet mill, or an opposed jet fluid energy mill. If a planetary mill is used, grinding media is preferred. If a mill like an opposed jet fluid energy mill is used, no grinding media is preferred. The starting powder, fluid medium, and optional grinding media are combined in predetermined proportions. The starting powder to grinding mass ratio can be, for example, from about 1:5 to about 1:50. The ratio of the volume of the fluid to the combined volume of the starting powder and the milling media can be from about 0.5:1 to about 3:1, and is preferably from about 0.5:1 to about 2:1, and more preferably from about 0.5:1 to about 1:1.

The high-energy mill can be any high-energy mill, for example, a centrifugal mill, and preferably a commercially available planetary ball mill, for instance, from Glen Mills, Inc. or Retsch (e.g., PM 400). Other examples include jet mills, like a spinning air flow jet mill, or fluid energy mills, like an opposed jet fluid energy mill (e.g., from CCE Technologies, Inc.). Examples of mills are also set forth in U.S. Pat. Nos. 5,522,558; 5,232,169; 6,126,097; and 6,145,765; all incorporated in their entirety by reference herein. Preferably, the high-energy mill is rotated at a sufficient speed so as to impart a high impact force of from about 0.3 G to about 25 G to the milling media and/or the powder. More preferably, the high-energy mill imparts a force of at least 0.5 G to the milling media and/or powder. For example, the high energy mill can be rotated at from about 100 to about 400 rpm or more, and is preferably rotated at least from about 300 rpm.

Grinding, for instance, can be achieved by using a planetary ball mill having a grinding chamber that includes a rotor shaft that is used to rotate grinding media. The grinding chamber is preferably provided with a liner or coating that is preferably made from tantalum. A high energy mill is also described in "Mechanical Alloying and High-Energy Ball-Milling: Technical Simplicity and Physical Complexity for the Synthesis of New Materials," by G. Le Caer, S. Begin-Colin, and P. Delcroix, which can be found at www.ademe.fr/recherche/manifestations/materiaux_2002/Site/file/pdf%5CCM01109.PDF, and in "Processing of Ceramic Powder Using High Energy Milling," by H. Zoz and H. Ren, which can be found at www.zoz.de/de/veroeff/19.htm, both of which are incorporated in their entireties herein by reference. The milling balls can be accelerated by the rotating rotor, and collide with each other at a relative velocity of up to 14 m/s or more.

Milling for any of the high-energy mills can occur for any predetermined amount of time, and is preferably for a time of about 10 hours or less, such as from about 30 minutes to about 10 hours, e.g., from about 2 to about 3 hours. The BET surface areas of the powder produced generally can relate to milling times.

After milling, the fluid can be separated or removed from the tantalum powder by any process, such as air-drying, heating, filtering, evaporating, or combinations thereof. The fluid is preferably removed by heating at any temperature sufficient to generally cause agglomeration and preferably without reducing the surface area. A temperature for heat treatment which can be used is approximately 1100° C. for about 30 minutes. However, the heating temperature and heating time can be modified to ensure that the high BET surface area is not reduced. BET analysis can be determined substantially as set forth in U.S. Pat. Nos. 6,402,066 B1; 6,165,623; 5,011,742; 4,960,471; and 4,964,906, all of which are incorporated in their entireties herein by reference.

The various tantalum powders described above can be further characterized by the electrical properties resulting from the formation of a capacitor using the tantalum powders of the present invention. In general, the tantalum powders of the present invention can be tested for electrical properties by pressing the tantalum powder into an anode and sintering the pressed tantalum powder at appropriate temperatures and then anodizing the anode to produce an electrolytic capacitor anode that can then be subsequently tested for electrical properties.

Accordingly, the present invention further relates to tantalum powder which when formed into an electrolytic capacitor anode, the anode has a capacitance of at least about 190,000 CV/g, and more preferably at least about 200,000 CV/g. Preferably, the tantalum powder when formed into an electrolytic capacitor anode, the anode has a capacitance of from about 190,000 to about 285,000 CV/g, and more preferably from about 200,000 to about 285,000 CV/g, and most preferably from about 250,000 to about 285,000 CV/g. These capacitances are preferably based on a formation voltage ($V_f$) of 20 V, wherein the powder has been sintered at about 1400° C. for 10 minutes. The tantalum powder can be formed into an anode and the capacitances measured substantially as follows.

An anode can be produced using a sintering can formed from tantalum. The sintering can used can measure 0.201 inches in diameter by 0.446 inches in length, and can be open at one end and have a tantalum wire welded to its outside. The sintering can is free-filled with low Scott density tantalum powder, weighed, and sintered. In forming the capacitor anodes of the present invention, a sintering temperature is used which will permit the formation of a capacitor anode having the desired properties. Preferably, the sintering temperature is from about 1200 to about 1750° C., more preferably from about 1200 to about 1500° C., and most preferably from about 1350 to about 1400° C. The sintered tantalum filled can is then anodized using a $V_f$ of from about 10 to about 50 V, and preferably from about 20 to about 35 V. The anodized and sintered tantalum filled can is then tested for capacitance (μF). The capacitance of an empty sintering can is subtracted from the capacitance of the tantalum filled sintering can to yield a true capacitance measurement. The resultant electrical analysis is reported in μFV/g.

The anodes formed from the tantalum powders of the present invention are preferably formed at a voltage of less than about 60 volts, preferably from about 10 to about 50 volts, and more preferably at about 40 volts. Preferably, the working voltages of anodes formed from the tantalum powders of the present invention are from about 4 to about 16 volts and more preferably from about 4 to about 10 volts. Also, the anodes formed from the tantalum powders of the present invention preferably have a DC leakage of less than about 5 na/CV. In an embodiment of the present invention, the anodes formed from some of the tantalum powders of the present invention have a DC leakage of from about 5 to about 0.5 na/CV or from about 2 to about 0.5 na/CV.

With the high capacitance tantalum powder, higher forming voltages and higher working voltages can be used, such as from about 50 to about 80 volts or higher formation and from about 10 to about 20 volts or higher working voltage. Also, an additional benefit of the present invention can be the improvement in DC leakage, e.g., stable or lower DC leakage as the BET of the tantalum increases.

Besides tantalum, the present invention is applicable to any valve metal which can be milled, such as valve metals including niobium. The resulting benefits, such as higher BETs, higher capacitance of the anode formed from the valve metal powder and/or the related forming voltage, working voltage, and improved or stable DC leakage, are also considered part of the present invention.

According to one embodiment of the present invention, the tantalum powder produced is used to form a capacitor. The capacitor can be formed by any method, for example, as described in U.S. Pat. Nos. 6,527,937 B2; 6,462,934 B2; 6,420,043 B1; 6,375,704 B1; 6,338,816 B1; 6,322,912 B1; 6,616,623; 6,051,044; 5,580,367; 5,448,447; 5,412,533; 5,306,462; 5,245,514; 5,217,526; 5,211,741; 4,805,704; and 4,940,490, all of which are incorporated herein in their entireties by reference. It is believed that capacitors made from the tantalum powder produced according to the present invention have improved electrical leakage characteristics. The capacitors of the present invention can be used in a variety of end uses such as automotive electronics; cellular phones; computers, such as monitors, mother boards, and the like; consumer electronics including TVs and CRTs; printers/copiers; power supplies; modems; computer notebooks; and disk drives.

The present invention will be further clarified by the following examples, which are intended to be exemplary of the present invention.

EXAMPLES

Example 1

Degassed KDEL tantalum starting powder was processed in a planetary ball mill (obtained from Glen Mills, Inc.) in which the starting powder was dispersed in a methanol medium (in an amount such that the volume ratio of the liquid to the powder and milling media ratio was 1:1), using 3/16" stainless steel balls (600 and 1998 balls in sample nos. 3 and 5, respectively) at 300 rpm for 8 hours. The tantalum powder was formed by the impact of the stainless steel balls propelled by the action of the relative rotating motion created between the milling chamber and the rotor shaft. Afterwards, the fluid was removed and the tantalum powder was washed and dried. Some of the powders produced from samples 3 and 5 are shown in FIGS. 2–10. The tantalum powder was then pressed in an anode can to a density of 3.5 g/cc. Samples of the pressed tantalum powder were then sintered in a vacuum (at less than $10^{-3}$ Pa) at the 1400° C. for 10 minutes, then anodized by applying 100 mA/g constant current at the forming voltage Vf of 20 V to the anode immersed in 0.1 weight percent phosphoric acid to produce electrolytic capacitor anodes, which were washed and dried. The capacitor performance characteristics, evaluated by measurements on the anodes immersed in 18 wt. % sulfuric acid, are reported in Table 1. Capacitance, determined at a frequency of 120 Hertz, is reported in units of microfarad volts per gram (CV/g).

TABLE 1

| Sample No. | Mill Type | Milling Ball Size (in.) | Milling Ball Number | Milling Time (hrs) | BET ($m^2/g$) | Sinter Temp. (° C.) | Sinter Time (min.) | $V_F$ | Capacitance (CV/g) |
|---|---|---|---|---|---|---|---|---|---|
| 1 | Attritor Mill | 3/16 | — | 16 | — | 1400 | 10 | 20 | 42,149 |
| 3 | Planetary Ball Mill | 3/16 | 600 | 8 | 1.73 | 1400 | 10 | 20 | 190,497 |
| 5 | Planetary Ball Mill | 3/16 | 1998 | 8 | 4.95 | 1400 | 10 | 20 | 233,285 |

As can be seen from Table 1, obtaining high surface area tantalum powder can be achieved in relatively short milling times by high impact milling using a high-energy ball-mill. FIGS. 1–9 are SEM photographs of the powders of Samples 3 or 5 at different magnifications. The anodes formed from the tantalum powder resulted in relatively high capacitance as set forth in Table 1. As can also be seen from Table 1, an increased proportion of milling media, i.e., stainless steel balls, results in increased powder surface areas and increased capacitance of anodes formed therefrom. Furthermore, the shortened milling times act to limit the amount of undesirable oxidation of the powder during the milling process.

Example 2

Figure 1:
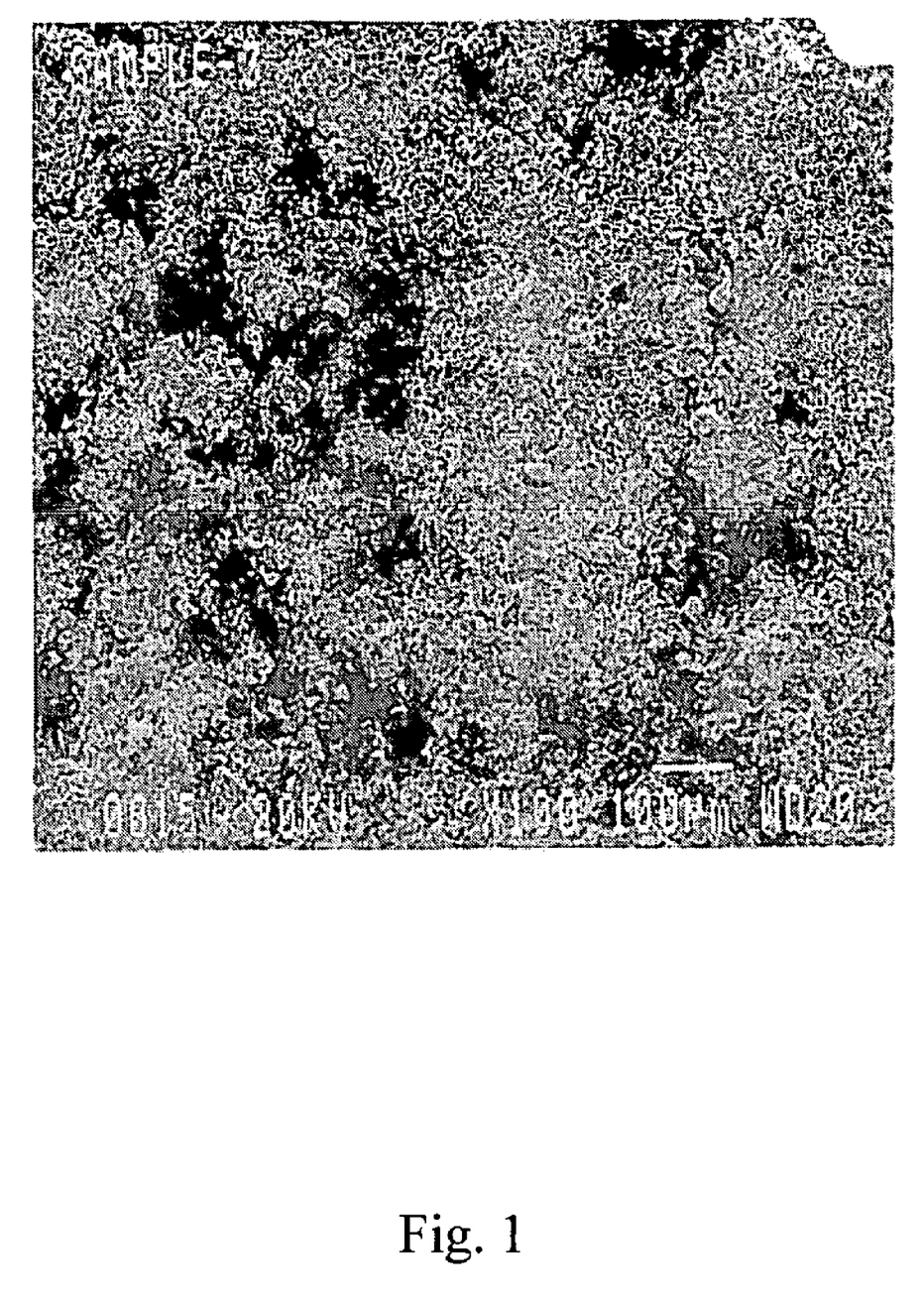
FIGS. 1–9 are SEM photographs of various high capacitance tantalum powders of the present invention at various magnifications.
Figure 2:
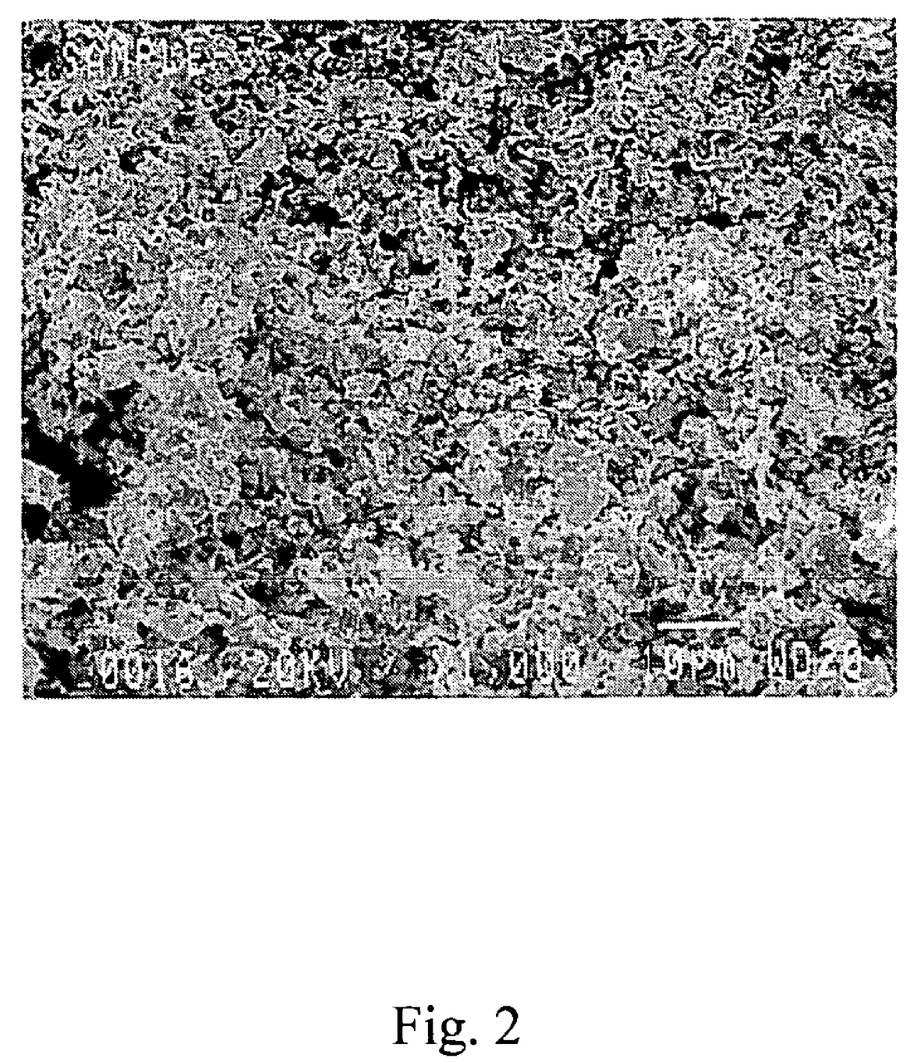
Figure 3:
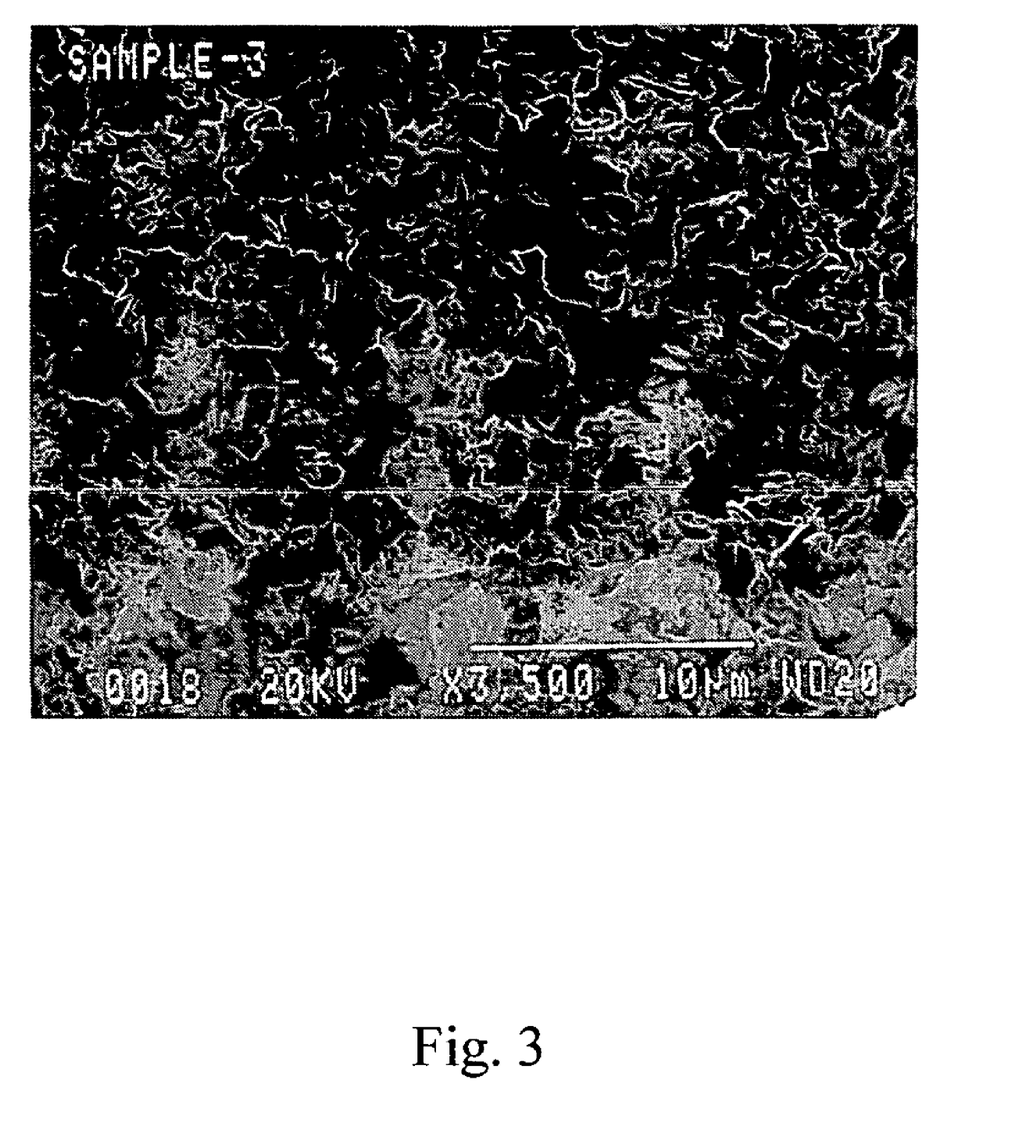
Figure 4:
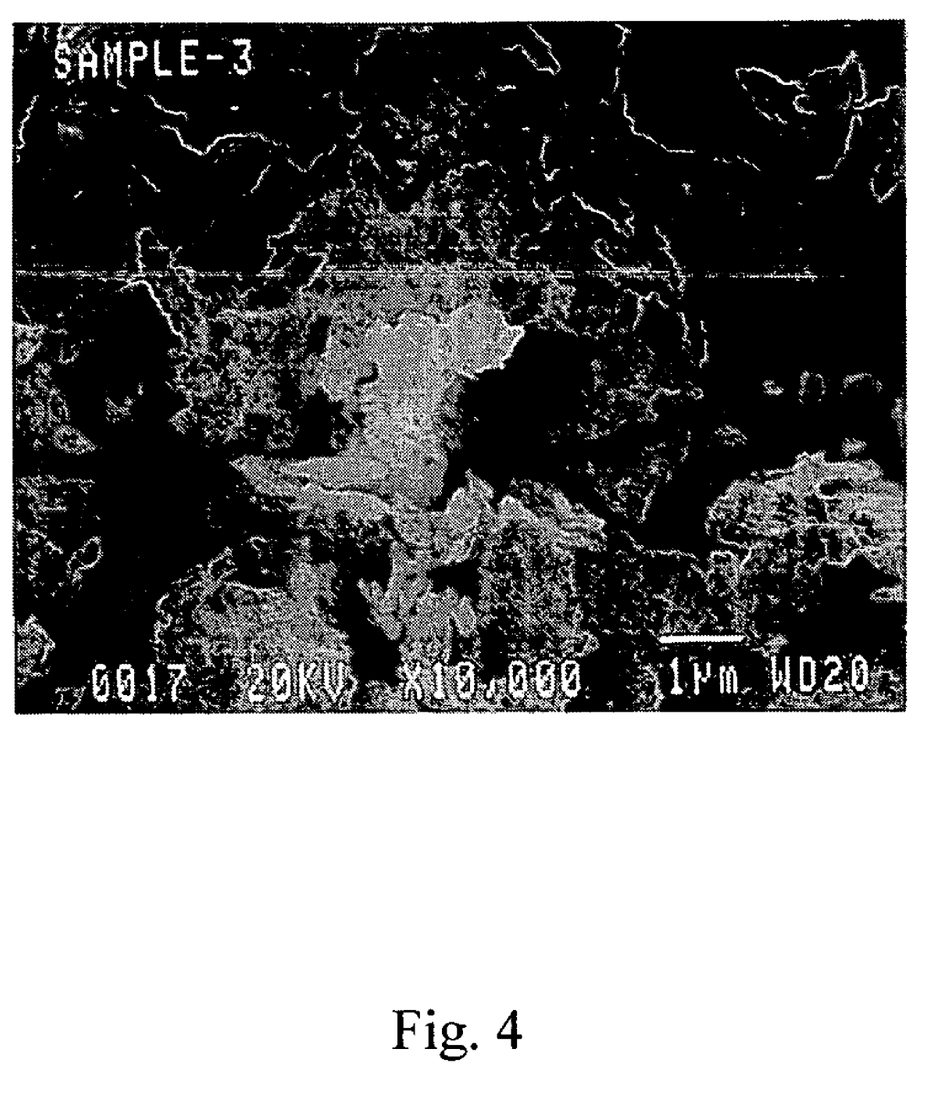
Figure 5:
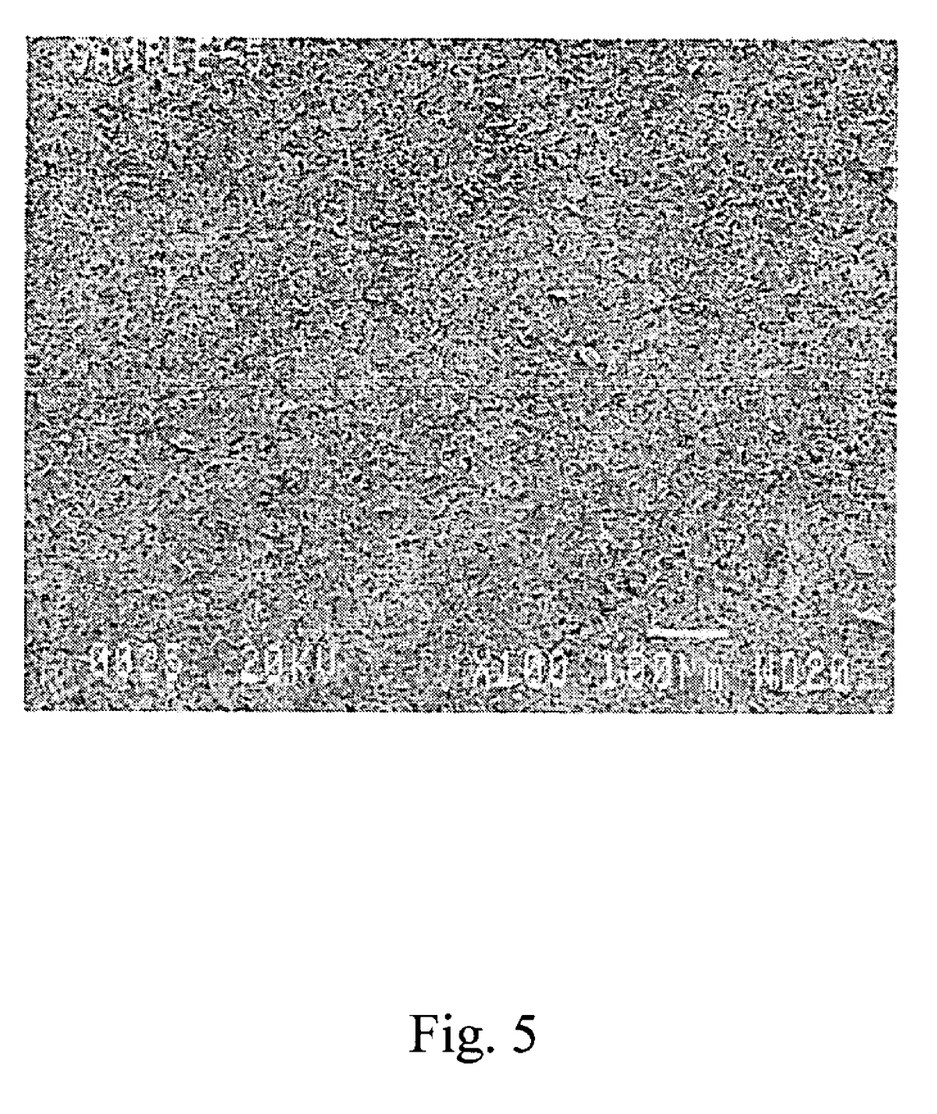
Figure 6:
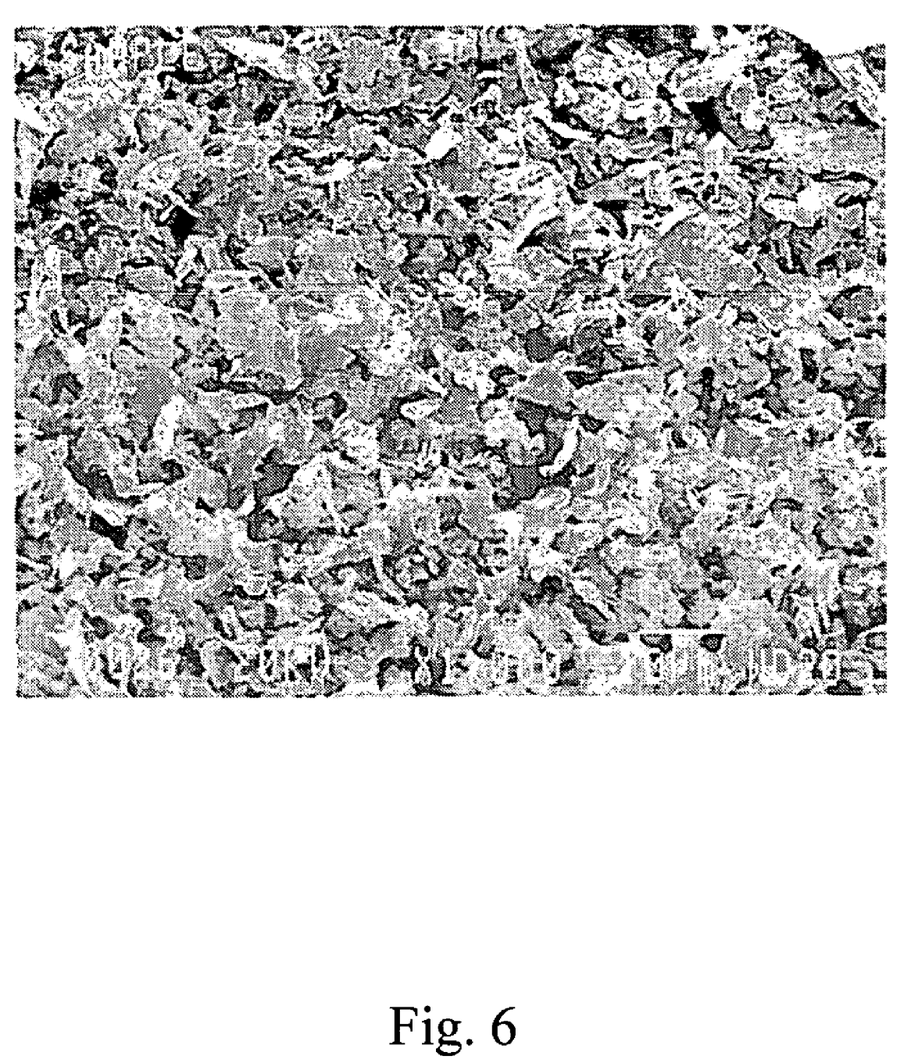
Figure 7:
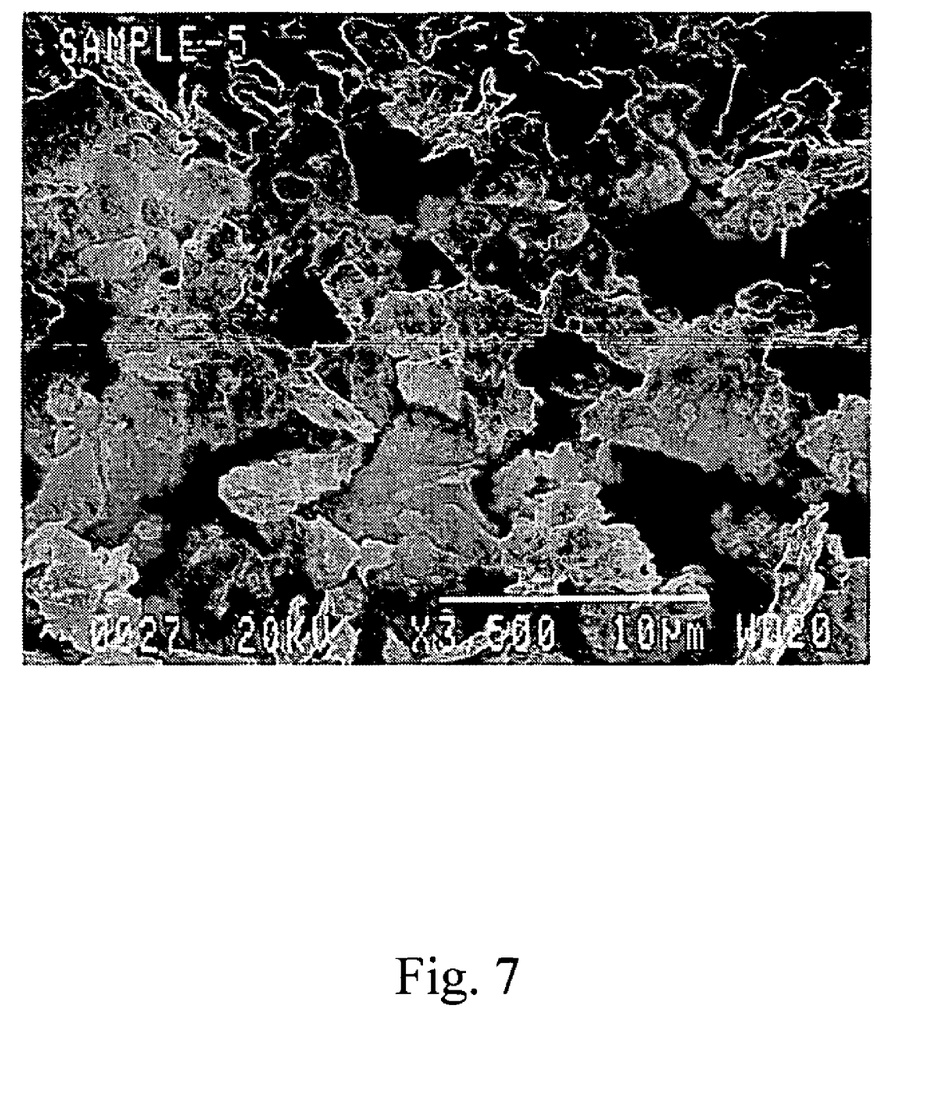
Figure 8:
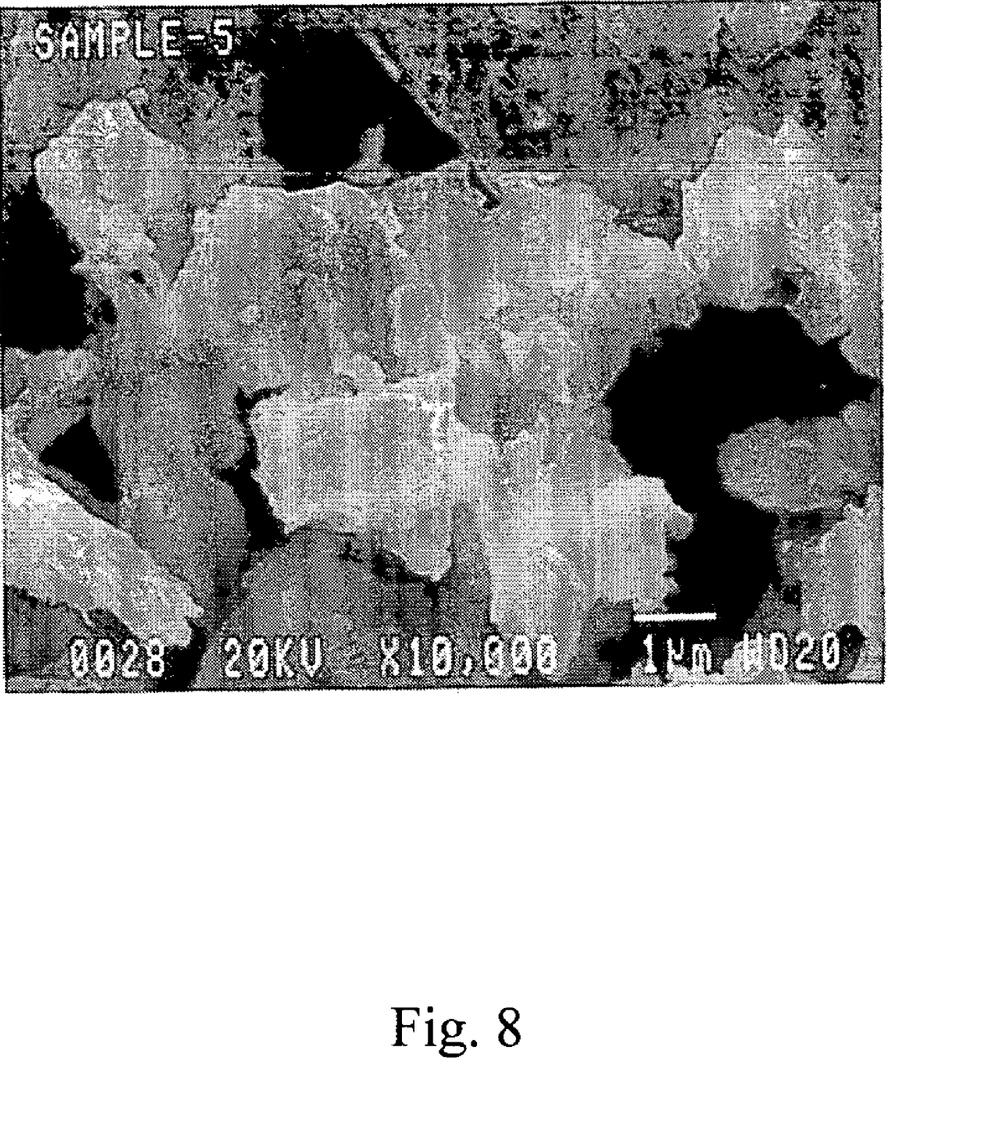
Figure 9:
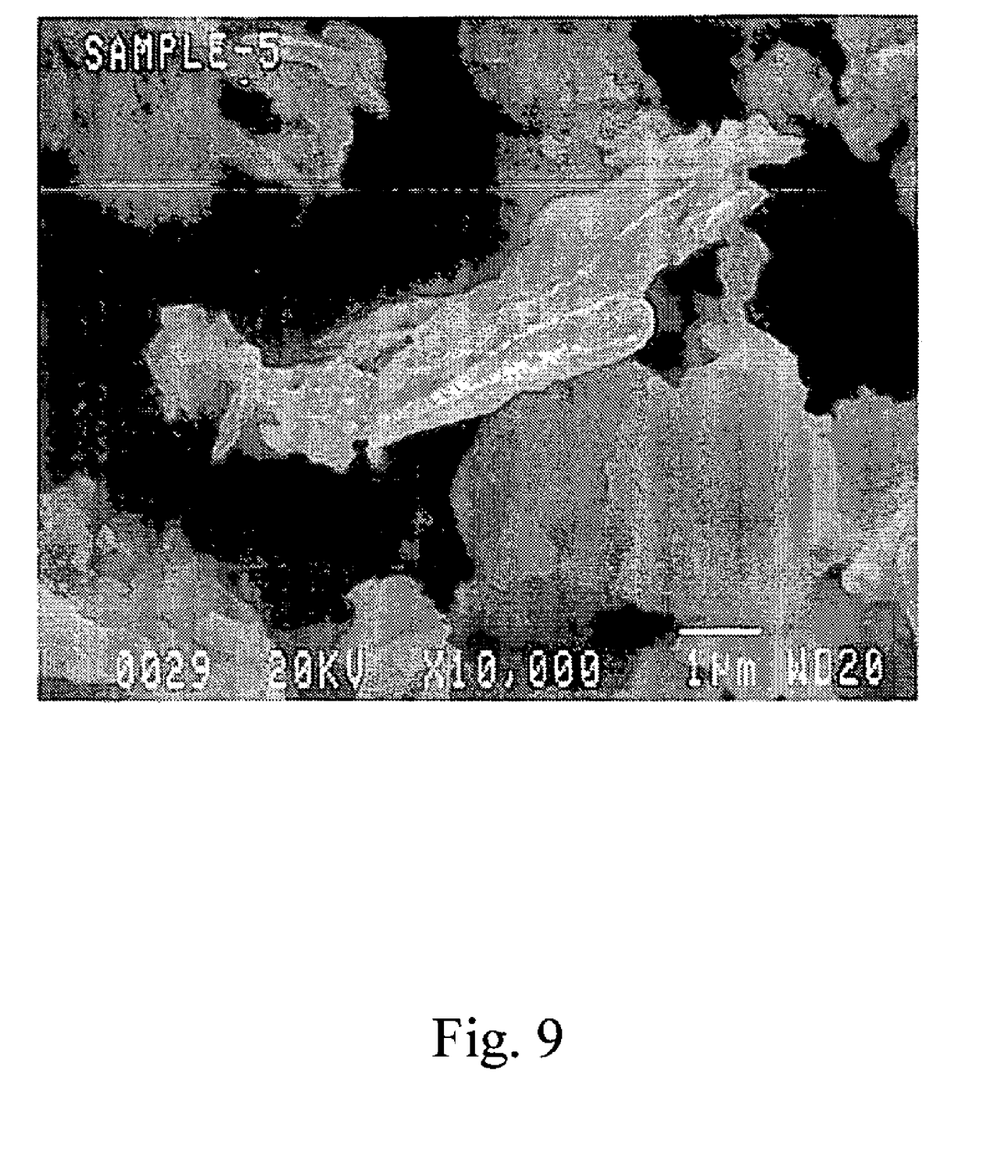
Figure 10:
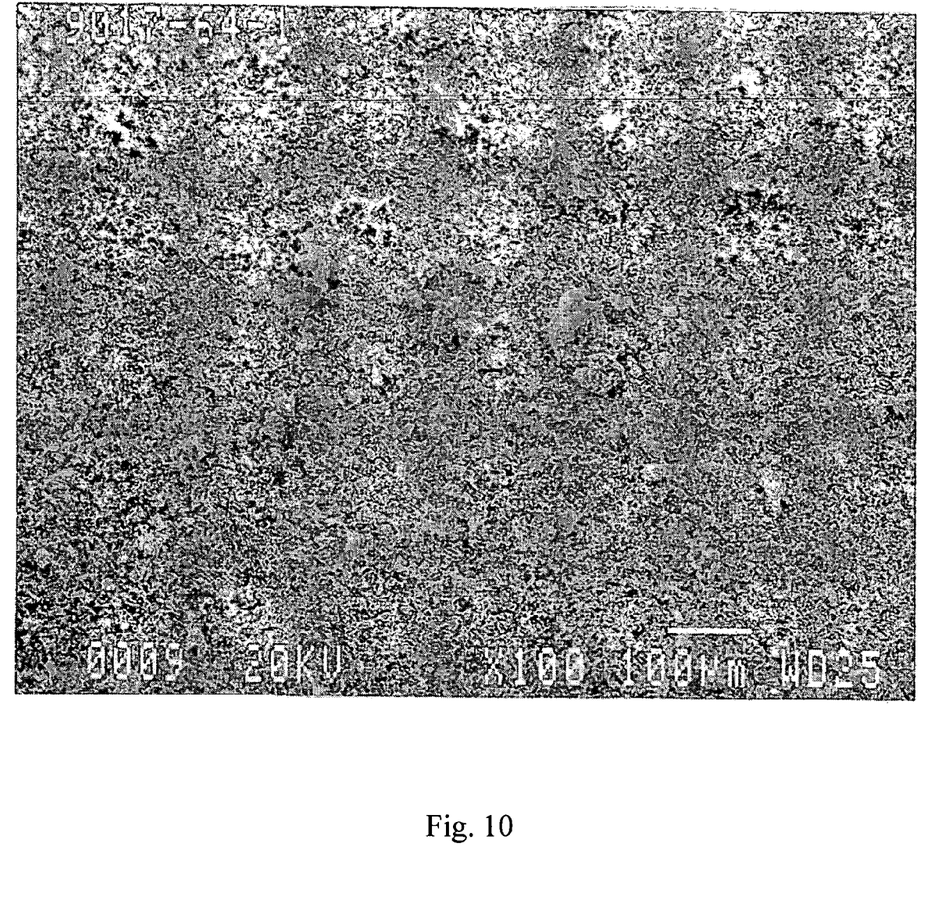
FIGS. 10–13 are additional SEM photographs of tantalum powders of the present invention at different magnifications.
Figure 11:
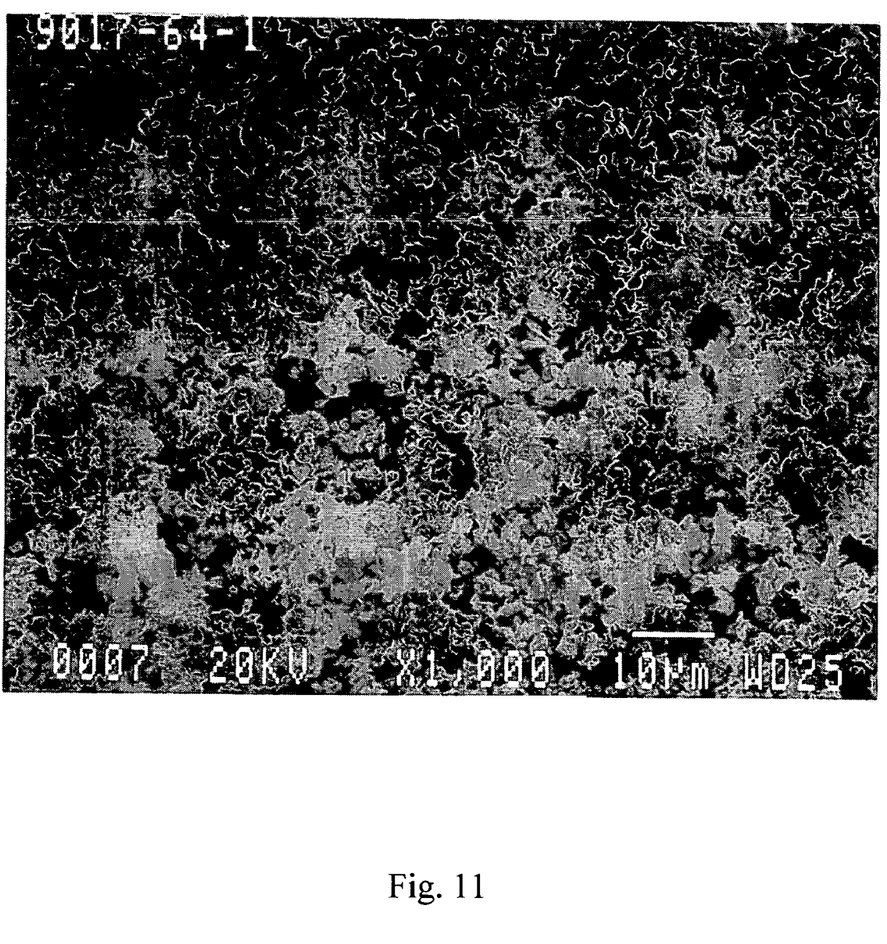
Figure 12:
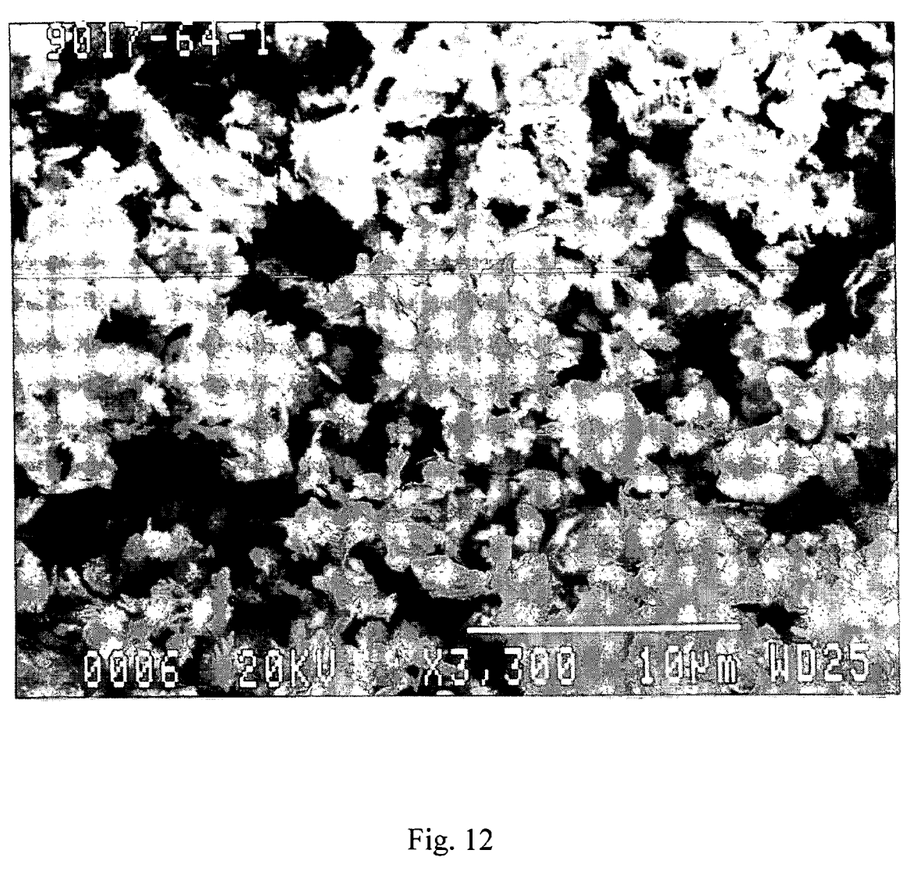
Figure 13:
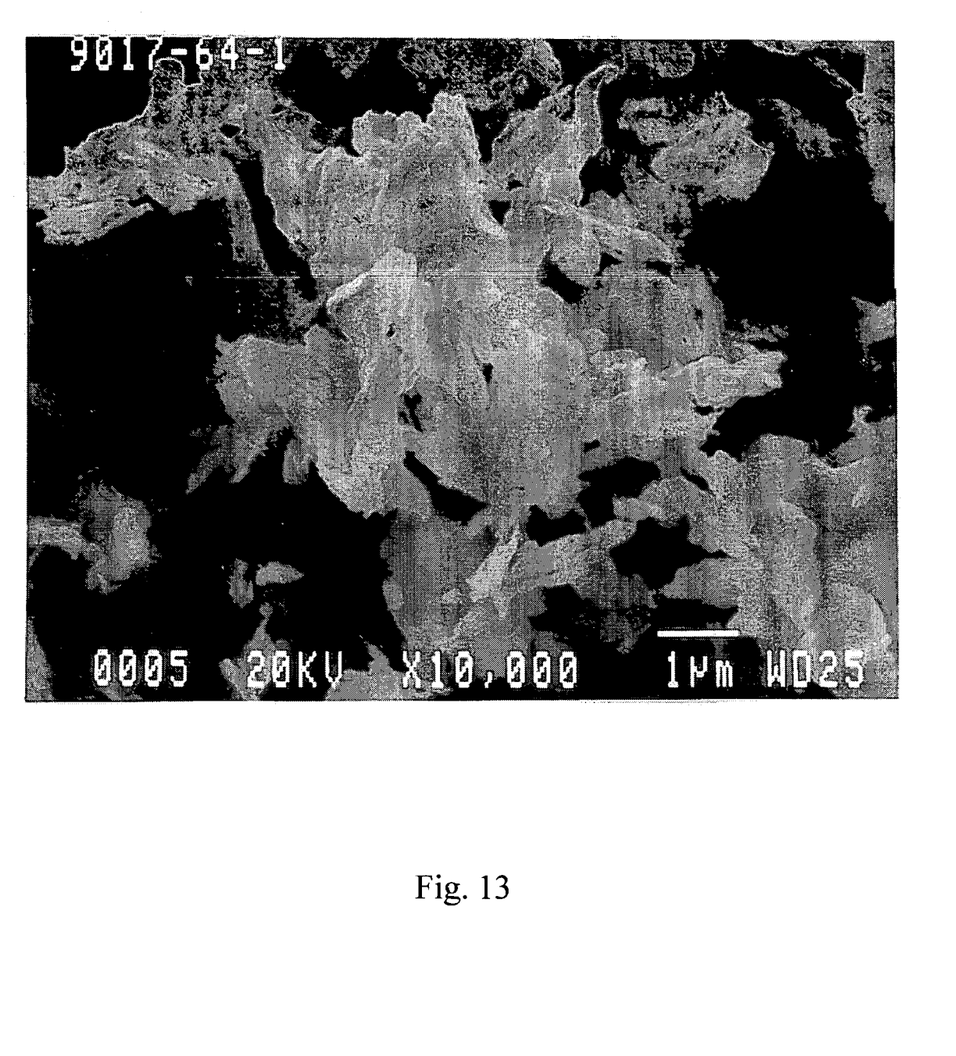

KDEL tantalum starting powder (sodium reduced Ta basic lot powder used to make commercially available C275 from Cabot Corporation) was processed in an opposed jet mill (obtained from CCE Technologies, Inc.) in which the starting powder was injected into the classifier, which was run at 2000 RPM. Particles that were smaller than 2 micron were carried through the rotor by the upward moving classification air. The oversize were rejected by the rotor and travel downward to the pulverizing zone. At this point the particles were accelerated by the controlled expansion of compressed fluid to a high velocity and then impacted against an opposing stream. After particle on particle impact, material is conveyed back to the classifier to repeat the cycle. The powders produced are shown in FIGS. 10 and 13. The tantalum powder (238 milligrams) was then pressed into an anode to a density of 4.5 g/cc. Samples of the pressed tantalum powder were then sintered in a vacuum (at less than $10^{-3}$ Pa) at the 1250° C. for 10 minutes, then anodized by applying 100 mA/g constant current at the forming voltage Vf of 20 V and a formation temperature of 83° C. to the anode immersed in 0.06 weight percent phosphoric acid to produce electrolytic capacitor anodes, which were washed and dried. The anode diameter was 0.15 inches. The capacitor performance characteristics, evaluated by measurements on the anodes immersed in 18 wt. % sulfuric acid, are reported in Table 2. Capacitance, determined at a frequency of 120 Hertz, is reported in units of microfarad volts per gram (CV/g).

As can be seen from Table 2, obtaining high surface area tantalum powder can be achieved by high impact milling using a high-energy fluid-mill. FIGS. 10–13 are SEM photographs of the powders at different magnifications. The anodes formed from the tantalum powder resulted in relatively high capacitance as set forth in Table 2.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. A tantalum powder, wherein said tantalum powder has a BET surface area of at least 1.5 $m^2/g$, and wherein when said tantalum powder is formed into an electrolytic capacitor anode, said anode has a capacitance of at least about 190,000 CV/g, when formed at a $V_f$ of 20 V and sintered at 1400° C. for 10 minutes.

2. The tantalum powder of claim 1, wherein said tantalum powder is flaked, nodular, angular, or combinations thereof.

3. The tantalum powder of claim 1, wherein said anode has a capacitance of from about 190,000 to about 285,000 CV/g.

4. A capacitor anode comprising the tantalum powder of claim 3.

5. The capacitor anode of claim 4, wherein said tantalum powder is sintered at a temperature of from about 1200 to about 1750° C.

6. The capacitor anode of claim 4, wherein said anode has a DC leakage of less than about 5.0 na/CV.

7. The capacitor anode of claim 4, wherein said anode has a DC leakage of from about 0.5 to about 2.0 na/CV.

8. The tantalum powder of claim 1, wherein said tantalum powder has a BET surface area of from about 1.5 to about 8 $m^2/g$.

9. A capacitor anode comprising the tantalum powder of claim 8.

10. The capacitor anode of claim 9, wherein said tantalum powder is sintered at a temperature of from about 1200 to about 1750° C.

TABLE 2

| Mill Type | Milling Ball Size (in.) | Milling Ball Number | Milling Time (hrs) | BET ($m^2/g$) | Sinter Temp. (° C.) | Sinter Time (min.) | $V_F$ | Capacitance (CV/g) |
|---|---|---|---|---|---|---|---|---|
| Opposed Jet Mill | — | — | — | 3.75 | 1250 | 10 | 20 | 80,156 |

11. The capacitor anode of claim 9, wherein said anode has a DC leakage of less than about 5.0 na/CV.

12. The capacitor anode of claim 9, wherein said anode has a DC leakage of from about 0.5 to about 2.0 na/CV.

13. The tantalum powder of claim 1, wherein said tantalum powder has a BET surface area of from about 1.7 to about 5 m²/g.

14. A capacitor anode comprising the tantalum powder of claim 13.

15. The capacitor anode of claim 14, wherein said tantalum powder is sintered at a temperature of from about 1200 to about 1750° C.

16. The capacitor anode of claim 14, wherein said anode has a DC leakage of less than about 5.0 na/CV.

17. The capacitor anode of claim 14, wherein said anode has a DC leakage of from about 0.5 to about 2.0 na/CV.

18. The tantalum powder of claim 1, wherein said tantalum powder has a BET surface area of at least 5 m²/g, and wherein said anode has a capacitance of from about 200,000 to about 285,000 CV/g.

19. A capacitor anode comprising the tantalum powder of claim 1.

20. The capacitor anode of claim 19, wherein said tantalum powder is sintered at a temperature of from about 1200 to about 1750° C.

21. The capacitor anode of claim 19, wherein said anode has a DC leakage of less than about 5.0 na/CV.

22. The capacitor anode of claim 19, wherein said anode has a DC leakage of from about 0.5 to about 2 na/CV.

* * * * *